J. Guild,
Boring Wood,
Nº 4,829.
Patented Oct. 29, 1846.
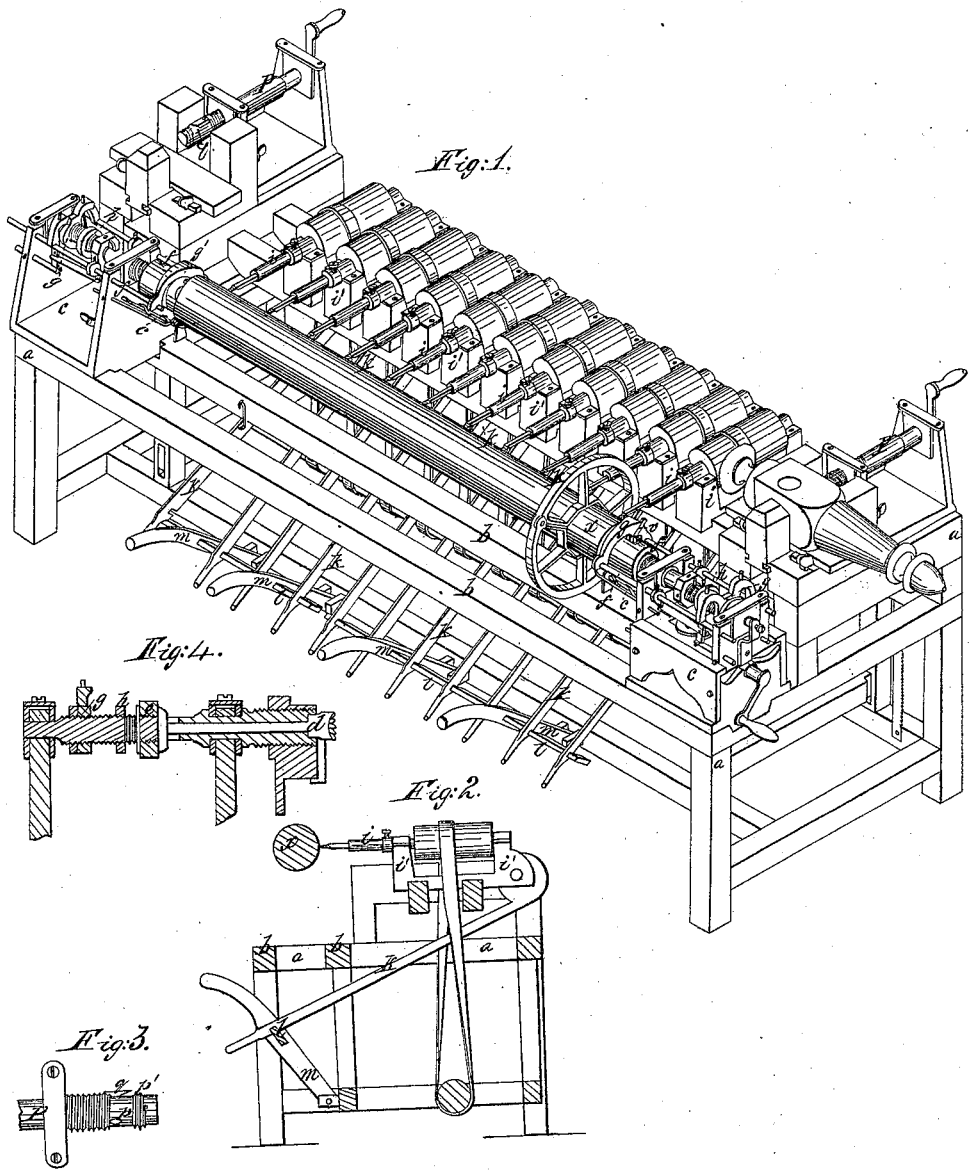

UNITED STATES PATENT OFFICE.

JOSEPH GUILD, OF CINCINNATI, OHIO.

BORING AND CUTTING SCREWS ON BEDSTEADS.

Specification of Letters Patent No. 4,829, dated October 29, 1846.

*To all whom it may concern:*

Be it known that I, JOSEPH GUILD, of Cincinnati, in the county of Hamilton and State of Ohio, have invented a new and Improved Apparatus for Cutting Screws on the Rails of Bedsteads and Tapping Posts to Connect Therewith, and that the following is a full, clear, and exact description of the principle or character which distinguishes it from all other things before known and of the manner of making, constructing, and using the same, reference being had to the accompanying drawings, making part of this specification, in which—

Figure 1 is an isometrical view of the machine; Fig. 2, a cross section; Fig. 3, an enlarged view of the tap, and Fig. 4, mandrel detached.

The same letters indicate like parts in all the figures.

It has heretofore been found difficult to tap posts of screw rail bedsteads clear down on account of the holes getting full of chips from the tap and various devices have been essayed to cut the screws and taps so as to make a close joint when the bedstead is put together as will hereafter be more clearly illustrated. To bore the holes for the pins in the rails they have heretofore been removed to another apparatus from that on which the screws were cut and the process was a long and inconvenient one. By my improvement this can be done on the same machine and any necessary number of holes can be bored at the same time completing the whole at one operation.

The construction of my apparatus is as follows: A proper frame (*a*) is formed something like a lathe frame only wider as shown in the drawing; the cheeks (*b*) are placed on the front of this frame or form a part thereof and on them slide two puppet heads (*c*) on which the mandrels are supported to which the rails are affixed; to the inner upright of each of these puppet heads there is a gage (*c′*) which comes against the shoulder of the rail when in place. The mandrel is hollow and has a center (*d*) see Fig. 4 which slides out against the end of the rail by means of a nut (*e*) working on a screw on the outside of the mandrel and connected with said center as shown in the section Fig. 4. On each side of the mandrel there is a rod (*f*) connected by connecting bars with the nut (*g*) in any convenient way, this nut has the screw of the mandrel to turn in it so as to move the nut forward and back and cause the rod to slide with it; on the ends of the rod (*f*) that project beyond the mandrel next to the rail, there is a curved piece of metal (*g′*) affixed in any convenient way so as to move with it; this extends over that part of the rail that is turned down to cut the screw on and a V cutter of ordinary make is fitted in it; therefore as the rail is turned the mandrel is carried around with it and the V cutter is forced forward by means of its connection with the screw on the mandrel above described. On this same screw there are two other nuts (*h*) which serve as gages between which the nut (*g*) plays, so that the mandrel can only be turned far enough to cut the proper length of screw on the rail the nut being caught and held at any desired point. When the rail is brought to the proper position by finishing the screw a series of parallel augers (*i*) are brought forward and bore the holes for the pins; these augers are each placed in a separate carriage (*i′*) which is connected by a connecting rod (*k*) with a bar (*l*) in front, so as to slide back and forth together or separately, as each rod can be disconnected at will. The bar (*l*) may be divided as shown in the drawing into two parts, which are supported on standards (*m*) that are jointed to the frame below; said standards are extended up above the bar far enough to form handles by which the bars are moved; one section of the augers consisting of a series of seven more or less attached to one of the bars will bore holes for the head rail of an ordinary bedstead, and the whole attached to both bars form a series for the side rail, more or less of these are used as required for different sizes by detaching any number from the bars before bringing them into action, (the connection of the bar and auger is more clearly shown in Fig. 2).

The tap P for making the nut in the post is similar to those now in common use, except that instead of having the end of the tube that enters the hole in the post open, it is stopped or closed; by this arrangement the chips that enter into the inside of the tool cannot fall into the hole in the post, and there become wedged, as is ordinarily the case; but are made to pass out through a hole (*p*) (see Fig. 3) above the screw (*p′*)

of the tap. It is obvious that the tool that cuts the thread on the male screw of the rail cannot cut close down to the shoulder, and that therefore the rail could not enter the post so as to bring its shoulder tight up to the post to form a perfect joint without some further device. Several methods have been employed to obviate this difficulty; one of the most common is to cut a hollow in under the shoulder, another to make the screw separate and glue it into the end of the rail, &c., but I attach a small cutter (*q*) to the outside of the tap so adjusted as to cut off a portion of the thread sufficient to allow the shoulder of the rail to screw up against the post; this leaves the thread stouter and makes a better finish in the post. To turn the rail (*x*) in the machine I employ a wheel clamp (*r*) which is affixed thereto in any ordinary manner as shown in the drawings.

Having thus fully described my improvements, what I claim as my invention and desire to secure by Letters Patent, is—

1. The combination of a series of augers in the manner described, by means of the connecting rods (*k*) and bars (*l*) substantially as described and connected with an apparatus for cutting screws on bedsteads as herein set forth and for the purposes specified, so that any required number of holes can be bored and in the right position for the pins.

2. Lastly, I claim attaching a cutter (*q*) to the tap for cutting the first turn of the thread from the nut so as to allow the rail to enter the post up to the shoulder as above specified the whole being performed at one operation.

JOSEPH GUILD.

Witnesses:
A. P. BROWNE,
L. D. WILLIAMS.